United States Patent
Kim et al.

(10) Patent No.: US 7,989,120 B2
(45) Date of Patent: Aug. 2, 2011

(54) SEPARATOR FOR HIGH-TEMPERATURE FUEL CELL

(75) Inventors: Do Hyung Kim, Daejeon (KR); Beom Joo Kim, Daejeon (KR); Jung Hyun Lee, Daejeon (KR); Seung Won Kang, Daejeon (KR); Hee Chun Lim, Daejeon (KR); Byung Soo Jung, Gyeongsangnam-do (KR)

(73) Assignee: Korea Electric Power Corporation, Seoul (KR)

( * ) Notice: Subject to any disclaimer, the term of this patent is extended or adjusted under 35 U.S.C. 154(b) by 298 days.

(21) Appl. No.: 12/341,703

(22) Filed: Dec. 22, 2008

(65) Prior Publication Data

US 2010/0112413 A1    May 6, 2010

(30) Foreign Application Priority Data

Oct. 31, 2008  (KR) .................. 10-2008-0107769

(51) Int. Cl.
*H01M 4/64* (2006.01)
(52) U.S. Cl. .................. 429/517; 429/464; 429/459
(58) Field of Classification Search .................. None
See application file for complete search history.

(56) References Cited

U.S. PATENT DOCUMENTS

| | | | |
|---|---|---|---|
| 5,175,062 A | 12/1992 | Farooque et al. | |
| 5,660,941 A | 8/1997 | Farooque et al. | |
| 5,811,202 A * | 9/1998 | Petraglia | 429/459 |
| 7,097,929 B2 | 8/2006 | Lee et al. | |

\* cited by examiner

*Primary Examiner* — Dah-Wei D Yuan
*Assistant Examiner* — Maria J Laios
(74) *Attorney, Agent, or Firm* — Workman Nydegger

(57) ABSTRACT

Provided is a high-temperature fuel cell separator. The fuel cell separator includes a fuel gas flow path containing hydrogen, an oxidant gas flow path containing mainly an oxygen component being supplied from an oxygen/nitrogen separator of a system and participating in electrochemical reactions, and a cooling gas flow path containing a nitrogen component to remove heat produced upon power generation of a fuel cell. Such a configuration provides a high-temperature fuel cell separator which is capable of improving efficiency of an overall fuel cell system through improved performance of a fuel cell stack due to increased oxygen partial pressure and which is also capable of improving reliability of the fuel cell stack through inhibition of the occurrence of a high-temperature region resulting from heat produced upon power generation of a fuel cell, by means of a flow of cooling gas containing a nitrogen component.

4 Claims, 4 Drawing Sheets

SEPARATOR FOR HIGH-TEMPERATURE FUEL CELL

CROSS-REFERENCE TO RELATED APPLICATION

The present application claims priority of Korean Patent Application Number 10-2008-0107769 filed Oct. 31, 2008, the entire contents of which application is incorporated herein for all purposes by this reference.

BACKGROUND OF THE INVENTION

1. Field of the Invention

The present invention relates to a high-temperature fuel cell separator. More specifically, the present invention relates to a high-temperature fuel cell separator which is capable of maximizing performance of a stack through efficient utilization of individual oxygen and nitrogen components supplied from an oxygen/nitrogen separator of a fuel cell system and which is also capable of improving reliability of a stack through inhibition of high-temperature region formation.

2. Description of Related Art

Generally, a fuel cell is a power generation system which employs hydrogen as a fuel and atmospheric oxygen as an oxidant and generates electricity with formation of water through oxidation-reduction reactions of hydrogen and oxygen.

Unlike other conventional power generation systems, fuel cells are attracting a great deal of interest as a next-generation alternative energy source, as they entail substantially no environmental pollution and noise and exhibit high-power generation efficiency.

In particular, a molten carbonate fuel cell (MCFC) or solid oxide fuel cell (SOFC), which is a high-temperature type fuel cell, is a system that produces electricity at high temperatures of 500° C. or higher. This type of a power generation system requires no use of a noble metal catalyst (such as platinum) for oxidation of hydrogen and reduction of oxygen, which therefore readily allows use of poisonous gas such as carbon monoxide, so it is possible to utilize coal gas as a fuel. In addition, it is also advantageous to exploit high-temperature waste heat, thus providing high efficiency of the system.

A unit cell of the fuel cell system is comprised of fuel and air electrodes where electrochemical reactions take place, a separator for forming flow paths of fuel and oxidant gases, a collector plate for collecting electric charges, and an electrolyte/support for ionic conduction. As used herein, the term "stack" refers to a multi-layered structure of unit cells.

The separator provides electrical connection between the unit cells, and simultaneously serves to offer a flow path of fuel gas to the fuel electrode and a flow path of oxidant gas to the air electrode.

In the fuel cell system as configured above, some of the energy of a fuel converts into electrical energy, whereas most of the remainder thereof converts into heat which will contribute to formation of a high-temperature region inside the stack.

The resulting high-temperature region will have adverse effects on individual components of a fuel cell, such as electrodes, electrolyte and separator.

In other words, a life span of the fuel cell stack may be significantly shortened due to various factors such as high temperature-induced structural changes in porous electrodes, increased corrosiveness and deformability of metal separator, and consequently leakage of fuel gas.

As a conventional art to inhibit the occurrence of such a high-temperature region, U.S. Pat. No. 7,097,929 discloses a technology of reducing gas flow-induced pressure by shortening a length of a flow path for oxidant gas consisting mainly of air, which makes it possible to supply large amounts of oxidant gas, thus inhibiting the occurrence of a high-temperature region. U.S. Pat. Nos. 5,175,062 and 5,660,941 disclose a technology to inhibit the occurrence of a high-temperature region, wherein heat necessary for reforming reactions is supplied from heat generation of the stack.

Conventionally, a separator based on an excess supply of oxidant gas has a fuel electrode flow path for migration of hydrogen fuel gas and carbon dioxide and an air electrode flow path for migration of air and carbon dioxide, wherein the fuel electrode portion and the air electrode portion are sequentially disposed.

Elevation of pressure takes place due to resistance to migration of excess gas in a given flow path, so a molten carbonate fuel cell among high-temperature fuel cells is configured to have a structure where fuel gas and oxidant gas are isolated from each other by way of an electrolyte impregnated in porous ceramic, for example, in the form of a wet seal.

Therefore, when an excess of the oxidant is supplied to inhibit the occurrence of the high-temperature region, this leads to inordinate elevation of pressure in the flow path, which consequently results in destruction of the wet seal, thus causing leakage of fuel gas and significant deterioration in a life span of the fuel cell stack. These problems have been solved up to now with a pressurized system, but there still remain disadvantageous limitations such as high complexity of the system and difficulty of system operation.

On the other hand, a separator intended to inhibit the occurrence of a high-temperature region of the stack taking advantage of an internal reforming reaction is configured to have a structure including a reforming chamber inside the separator, such that heat produced from electrode reactions can be used for heat absorption of the reforming reaction.

However, since such a separator has a structure with inclusion of a reforming catalyst, poison of the reforming catalyst may limit a life span of the stack. Additionally, when it is desired to use coal gas, there is a disadvantage associated with a need for re-conversion of produced hydrogen into methane prior to use thereof.

As another conventional art, there is a method of using oxygen as oxidant gas, by means of an oxygen/nitrogen separator. This technology is intended to improve performance of the stack by elevating oxygen partial pressure of the air electrode. Improvements of the stack performance may result in reduction of internal heat generation, but it is inevitable that only limited inhibitory effects on formation of a high-temperature region of the stack are obtained.

BRIEF SUMMARY OF THE INVENTION

Therefore, the present invention has been made in view of the above problems, and it is an object of the present invention to provide a high-temperature fuel cell separator which is capable of improving performance of the separator as compared to a conventional fuel cell, by elevating oxygen partial pressure in a flow path of an air electrode where electrochemical reaction takes place, through separate installation of oxygen and nitrogen flow paths inside a separator of a fuel cell, and which is also capable of effectively removing heat generated upon the generation of electricity, by means of a flow path of nitrogen gas.

In accordance with the present invention, the above and other objects can be accomplished by the provision of a high-temperature fuel cell separator including a fuel electrode 10 and an air electrode 80 as electrode plates; a pair of mask plates 20,70 for providing a seal between the pair of electrodes; current collectors 30,60 for providing electrical connection with the electrode pair; and corrugated plates 40,50 for inhibiting mixing of fuel gas and air.

In a preferred embodiment of the present invention, between the fuel electrode corrugated plate 40 and the air electrode corrugated plate 50 is further provided a support 90 which serves to seal internal manifolds 21a,21b,71a,71b formed on both sides of the mask plates 20,70, current collectors 30,60 and corrugated plates 40,50 and is responsible for a height of a nitrogen gas flow path.

Further, according to the present invention, among gases flowing through the separator, fuel gas 11 flows between the fuel electrode current collector 30 and the fuel electrode corrugated plate 40 through internal manifolds 21a,21b of the separator, oxidant gas 81 flows between the air electrode corrugated plate 50 and the air electrode current collector 60 through internal manifolds 71a,71b of the separator, and nitrogen gas 51 for cooling of a stack flows between the fuel electrode corrugated plate 40 and the air electrode corrugated plate 50 through an external manifold.

DETAILED DESCRIPTION OF THE INVENTION

Hereinafter, the present invention will be described in more detail with reference to the accompanying drawings.

Figure 1:
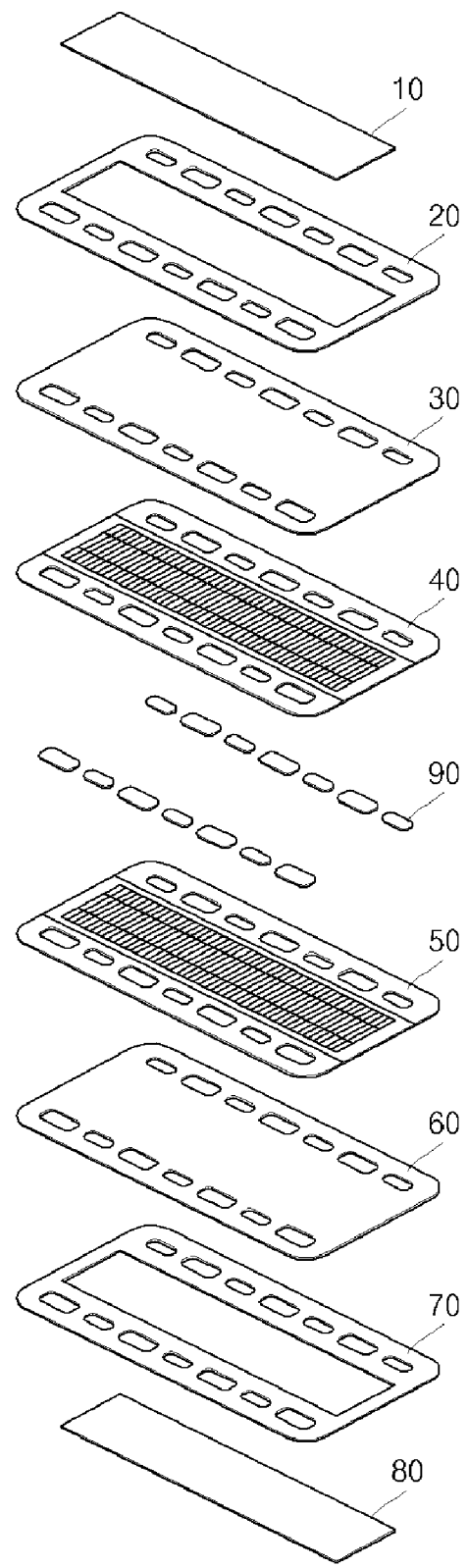
FIG. 1 is an exploded perspective view of a high-temperature fuel cell separator in accordance with one embodiment of the present invention.
Figure 2:
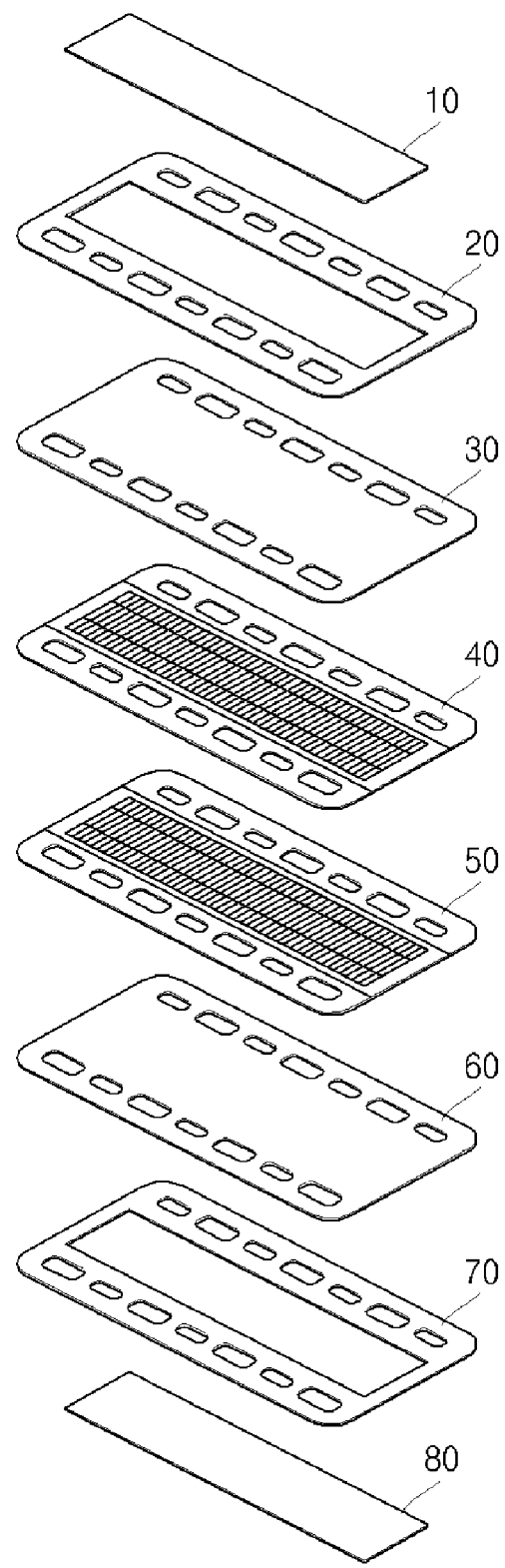
FIG. 2 is an exploded perspective view of a high-temperature fuel cell separator in accordance with another embodiment of the present invention.
Figure 3:
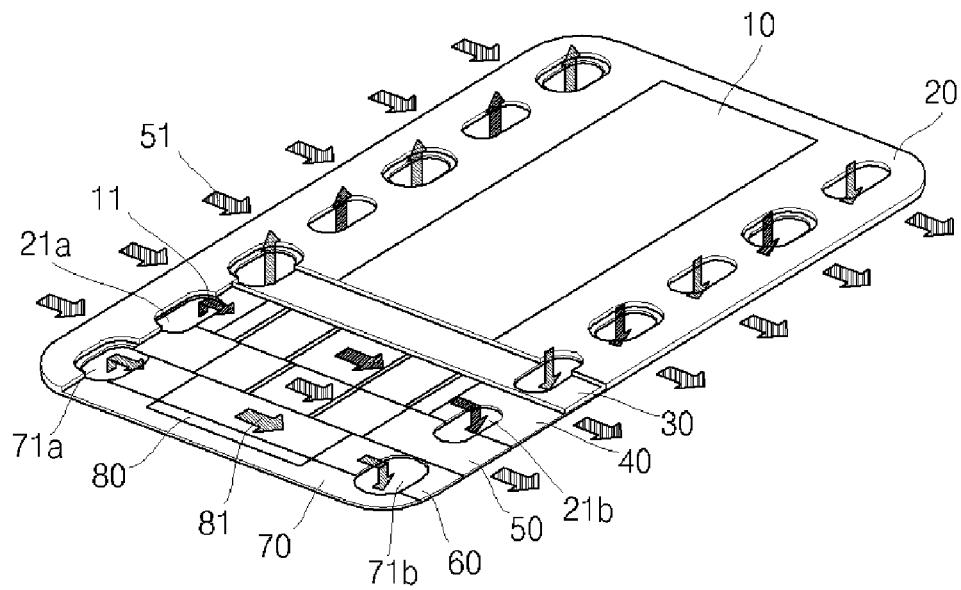
FIG. 3 is a partially cutaway perspective view of a high-temperature fuel cell separator as shown in FIG. 2.

FIG. 1 is an exploded perspective view of a high-temperature fuel cell separator in accordance with one embodiment of the present invention, FIG. 2 is an exploded perspective view of a high-temperature fuel cell separator in accordance with another embodiment of the present invention, and FIG. 3 is a partially cutaway perspective view of a high-temperature fuel cell separator as shown in FIG. 2.

The present invention provides a fuel cell which is configured to have a structure such that two electrode plates consisting of a fuel electrode 10 and an air electrode 80 are installed on both opposite sides of a dense electrolyte layer; hydrogen-containing fuel gas and oxygen-containing air are supplied to each of the corresponding electrode plates to induce ionic conduction on the electrolyte layer; and then an electrochemical reaction between the fuel-borne hydrogen and air-borne oxygen occurs taking advantage of ionic conduction to thereby produce electricity from chemical energy of a fuel. As shown in FIG. 1, the fuel cell separator includes a fuel electrode 10 and an air electrode 80 as electrode plates; a pair of mask plates 20,70 for providing a seal between the pair of electrodes; current collectors 30,60 for providing electrical connection with the electrode pair; and corrugated plates 40,50 for inhibiting mixing of fuel gas and air.

The mask plates 20,70 are composed of the fuel electrode mask plate 20 for providing a hermetic seal between the fuel electrode 10 and the fuel electrode current collector 30 and the air electrode mask plate 70 for providing a hermetic seal between the air electrode current collector 60 and the air electrode 80.

The current collectors 30,60 are composed of the fuel electrode current collector 30 for providing electrical connection with the fuel electrode 10 and the air electrode current collector 60 for providing electrical connection with the air electrode 80.

The corrugated plates 40,50 are composed of the fuel electrode corrugated plate 40 for preventing mixing of hydrogen-containing fuel gas and nitrogen gas and the air electrode corrugated plate 50 for preventing mixing of nitrogen gas and oxygen-bearing oxidant gas.

The separator of the present invention may further include a support 90 which serves to hermetically seal internal manifolds 21a,21b,71a,71b formed on both sides of the mask plates 20,70, current collectors 30,60 and corrugated plates 40,50 and is responsible for a height of a nitrogen gas flow path.

Referring to FIG. 2, it shows another embodiment of the separator wherein the fuel electrode corrugated plate 40 and the air electrode corrugated plate 50 are used as a support member, instead of the support 90 of FIG. 1 for sealing the internal manifolds 21a,21b,71a,71b of the separator and determining a height of a nitrogen gas flow path.

Hereinafter, flows of fuel gas and air in the high-temperature fuel cell separator of the present invention will be described with reference to FIG. 3.

First, fuel gas 11 flows between the fuel electrode current collector 30 and the fuel electrode corrugated plate 40 through internal manifolds 21a,21b formed on both sides of the separator, and oxidant gas 81 flows between the air electrode corrugated plate 50 and the air electrode current collector 60 through internal manifolds 71a,71b formed on both sides of the separator.

On the other hand, nitrogen gas 51 for cooling of a stack flows between the fuel electrode corrugated plate 40 and the air electrode corrugated plate 50 through an external manifold (not shown).

Through the above-mentioned configuration of the separator, among gas components flowing into the air electrode 80, the oxidant gas 81 maximizes oxygen partial pressure to thereby improve performance of the stack and the nitrogen gas 51 inhibits the occurrence of a high-temperature region inside the stack, which provides a uniform temperature distribution to thereby improve durability of the stack.

Hereinafter, effects derived from the present invention having the above-mentioned configuration will be graphically described with reference to FIGS. 4 and 5.

Figure 4:
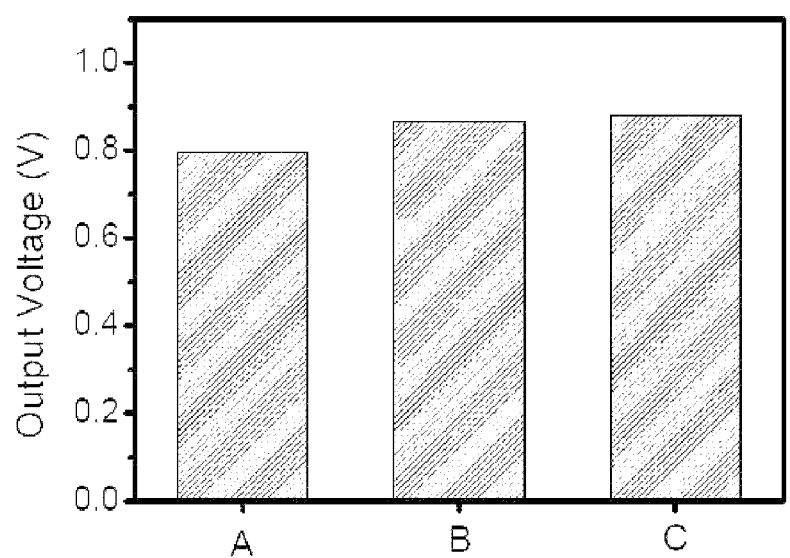
FIG. 4 is a graph comparing the cell performance results obtained when separated nitrogen and oxygen (B) in accordance with the present invention are allowed to flow into an air electrode and the cell performance results obtained when air (A) and oxygen (C) are respectively allowed to flow into an air electrode.
Figure 5:
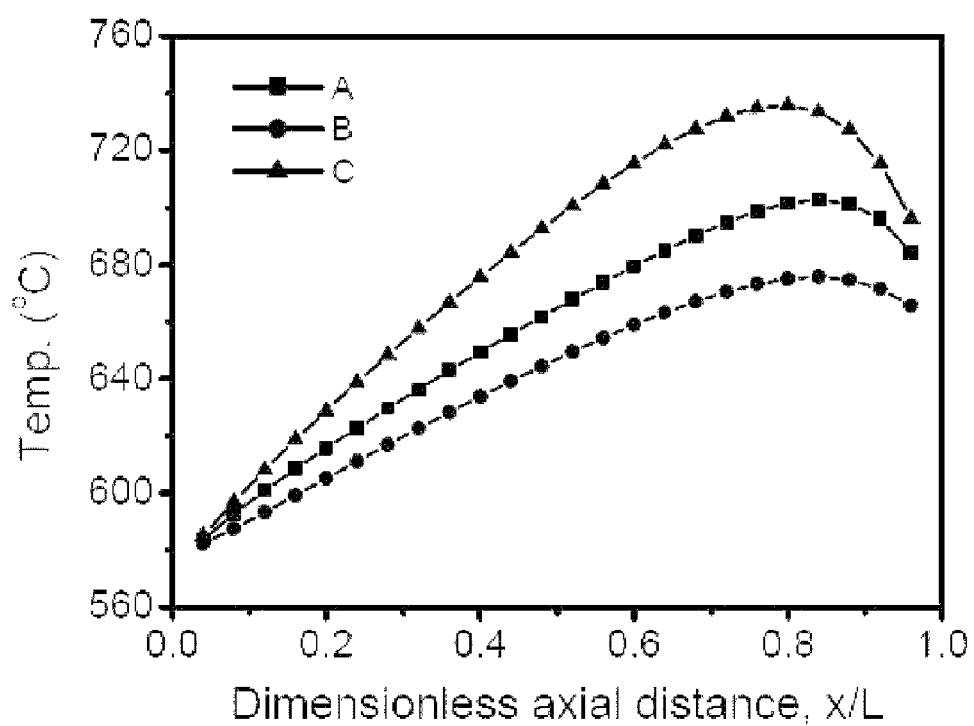
FIG. 5 is a graph comparing the internal cell temperature obtained when separated nitrogen and oxygen (B) in accordance with the present invention are allowed to flow into an air electrode and the internal cell temperature obtained when air (A) and oxygen (C) are respectively allowed to flow into an air electrode.

FIG. 4 is a graph comparing the cell performance results obtained when separated nitrogen and oxygen (B) in accordance with the present invention are allowed to flow into an air electrode and the cell performance results obtained when air (A) and oxygen (C) are respectively allowed to flow into an air electrode; and FIG. 5 is a graph comparing the internal cell temperature obtained when separated nitrogen and oxygen (B) in accordance with the present invention are allowed to flow into an air electrode and the internal cell temperature obtained when air (A) and oxygen (C) are respectively allowed to flow into an air electrode. Referring to FIG. 4, it can be seen that very excellent performance is obtained when oxygen (C) or the separated nitrogen and oxygen (B) in accordance with the present invention are allowed to flow into the air electrode, as compared to when air (A) is allowed to flow into the air electrode under the same conditions of the stack.

This suggests that performance of the fuel cell stack is improved through elevation of oxygen partial pressure in a flow path of the air electrode.

Referring to FIG. 5, it can be seen that although oxygen (C) exhibits very excellent results in the cell performance as shown in FIG. 4, a low flow containing only oxygen with the exception of nitrogen accounting for 80% of atmospheric components leads to less reduction of heat generation from the stack thus causing the formation of a high-temperature region having a relatively very high temperature inside the stack.

Air (A) contains nitrogen and thus allows a relatively larger flow into the air electrode than does a flow of oxygen (C) alone, so it may be possible to remove more heat generation from the stack. From the results of FIG. 4, however, it can be seen that heat generation which is larger takes place corresponding to relatively poor performance of the cell.

On the other hand, when nitrogen and oxygen (B) are separated according to the present invention, very high performance of the cell is obtained. At the same time, it can be seen from the results of FIG. 4 that very excellent inhibition results can also be obtained on formation of a high-temperature region inside the stack.

As apparent from the above description, a high-temperature fuel cell separator in accordance with the present invention has a structure with division of an air electrode flow path of a conventional fuel cell separator into an oxygen flow path and a nitrogen flow path, whereby oxygen partial pressure of an air electrode is increased by the oxygen flow path to maximize performance of the fuel cell, and the occurrence of a high-temperature region inside a stack is inhibited by the nitrogen flow path to achieve a uniform temperature distribution, thus improving reliability of the stack. In addition, reduction of production costs can be obtained by an excess supply of oxidant gas or use of an internal reforming catalyst.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A molten carbonate fuel cell separator, comprising:
   a fuel electrode and an air electrode as electrode plates;
   a pair of mask plates for providing a seal between the pair of electrodes;
   current collectors for providing electrical connection with the electrode pair; and
   corrugated plates for inhibiting mixing of fuel gas, oxidant gas, and nitrogen gas,
   wherein the corrugated plates are composed of the fuel electrode corrugated plate for preventing mixing of hydrogen-containing fuel gas and nitrogen gas and the air electrode corrugated plate for preventing mixing of nitrogen gas and oxygen-bearing oxidant gas, and
   wherein fuel gas flows between the fuel electrode current collector and the fuel electrode corrugated plate through internal manifolds of the separator, oxidant gas flows between the air electrode corrugated plate and the air electrode current collector through internal manifolds of the separator, and nitrogen gas for cooling of a stack flows between the fuel electrode corrugated plate and the air electrode corrugated plate through an external manifold.

2. The separator according to claim 1, wherein between the corrugated plates is further provided a support which serves to seal internal manifolds formed on both sides of the mask plates, current collectors and corrugated plates and is responsible for a height of a nitrogen gas flow path.

3. The separator according to claim 1, wherein the mask plates are composed of the fuel electrode mask plate for providing a hermetic seal between the fuel electrode and the fuel electrode current collector and the air electrode mask plate for providing a hermetic seal between the air electrode current collector and the air electrode.

4. The separator according to claim 1, wherein the current collectors are composed of the fuel electrode current collector for providing electrical connection with the fuel electrode and the air electrode current collector for providing electrical connection with the air electrode.

* * * * *